United States Patent
Gajbhiye et al.

(10) Patent No.: US 11,016,850 B2
(45) Date of Patent: May 25, 2021

(54) SYSTEMS AND METHODS FOR DETECTING BIT ROT IN DISTRIBUTED STORAGE DEVICES HAVING FAILURE DOMAINS

(71) Applicant: Veritas Technologies LLC, Mountain View, CA (US)

(72) Inventors: Sushrut Gajbhiye, Pune (IN); Deodatta Barhate, Pune (IN); Roshan Kolhe, Wardha (IN); Shailesh Marathe, Pune (IN); Anindya Banerjee, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 343 days.

(21) Appl. No.: 15/925,809

(22) Filed: Mar. 20, 2018

(65) Prior Publication Data
US 2019/0294501 A1   Sep. 26, 2019

(51) Int. Cl.
*G06F 11/10* (2006.01)
*G06F 21/55* (2013.01)
*G06F 21/57* (2013.01)

(52) U.S. Cl.
CPC ...... *G06F 11/1088* (2013.01); *G06F 11/1076* (2013.01); *G06F 21/554* (2013.01); *G06F 21/577* (2013.01); *G06F 2221/034* (2013.01)

(58) Field of Classification Search
CPC ............. G06F 11/1088; G06F 11/1076; G06F 21/554; G06F 21/577; G06F 2221/034
See application file for complete search history.

(56) References Cited

U.S. PATENT DOCUMENTS

| 7,080,278 B1 * | 7/2006 | Kleiman | G06F 11/1076 714/6.24 |
| 7,346,831 B1 * | 3/2008 | Corbett | G06F 11/1076 714/5.11 |
| 7,519,629 B2 * | 4/2009 | Hafner | G06F 11/1076 707/999.202 |

(Continued)

OTHER PUBLICATIONS

Long, Darrell DE, Bruce R. Montague, and Luis-Felipe Cabrera. "Swift/RAID: a distributed RAID system." Computing Systems 7.3 (1994): 333-359. (Year: 1994).*

(Continued)

*Primary Examiner* — Robert B Leung
*Assistant Examiner* — Sameera Wickramasuriya
(74) *Attorney, Agent, or Firm* — FisherBroyles, LLP

(57) ABSTRACT

The disclosed computer-implemented method for detecting bit rot in distributed storage devices having failure domains may include (1) receiving, at a computing device, a combination of data chunks created by adding, for each failure domain storing data chunks, data chunks from different stripes, (2) receiving a combination of parity chunks created by adding, for each failure domain storing parity chunks, parity chunks from the different stripes, (3) creating at least one new parity chunk from the combination of data chunks, and (4) identifying a presence of bit rot in the failure domains when the at least one new parity chunk does not match the combination of parity chunks. Various other methods, systems, and computer-readable media are also disclosed.

21 Claims, 4 Drawing Sheets

(56) References Cited

U.S. PATENT DOCUMENTS

| | | | | |
|---|---|---|---|---|
| 7,647,526 | B1* | 1/2010 | Taylor | G06F 11/1092 714/6.32 |
| 7,689,890 | B2* | 3/2010 | Cherian | G06F 11/1076 711/114 |
| 7,698,625 | B2* | 4/2010 | Horn | G06F 11/1076 711/114 |
| 7,970,996 | B1* | 6/2011 | Corbett | G06F 11/1088 711/114 |
| 8,327,250 | B1* | 12/2012 | Goel | G06F 11/1076 714/801 |
| 2007/0089045 | A1* | 4/2007 | Corbett | G06F 11/1076 714/801 |
| 2008/0115017 | A1* | 5/2008 | Jacobson | G06F 11/1076 714/710 |
| 2008/0168225 | A1* | 7/2008 | O'Connor | G06F 11/1088 711/114 |
| 2008/0184067 | A1* | 7/2008 | Ito | G06F 11/1076 714/6.12 |
| 2010/0251072 | A1* | 9/2010 | Hafner | G06F 11/1076 714/763 |
| 2012/0079351 | A1* | 3/2012 | Cideciyan | G06F 11/1048 714/764 |
| 2014/0372838 | A1* | 12/2014 | Lou | G06F 11/1076 714/801 |

OTHER PUBLICATIONS

Kroth, Brian, and Suli Yang. "Checksumming RAID." (2010). (Year: 2010).*

Pugh, C., T. Carrol, and P. Henderson. "Ensuring high availability and recoverability of acquired data." 2011 IEEE/NPSS 24th Symposium on Fusion Engineering. IEEE, 2011. (Year: 2011).*

International Search Report and Written Opinion received for PCT Application Serial No. PCT/US2019/022609 dated May 23, 2019, 10 pages.

* cited by examiner

SYSTEMS AND METHODS FOR DETECTING BIT ROT IN DISTRIBUTED STORAGE DEVICES HAVING FAILURE DOMAINS

BACKGROUND

Bit rot is a slow deterioration in data integrity of storage media. Bit rot may also be known as bit decay, data rot, data decay and/or silent corruption. Bit rot may occur when bits on hard drives randomly change states. With recent growth in data storage capacities and increases in time durations in which data resides on storage media (e.g., for archival use), chances of specific data being impacted by bit rot increases. Thus, there is an ever-increasing need for systems and methods for detecting and correcting bit rot. Conventional methods for detecting bit rot send all data chunks and all parity chunks over networks for remote analysis. This results in detecting taking long periods of time and requiring large quantities of network bandwidth. The instant disclosure, therefore, identifies and addresses a need for systems and methods for detecting bit rot in distributed storage devices having failure domains.

SUMMARY

As will be described in greater detail below, the instant disclosure describes various systems and methods for detecting bit rot in distributed storage devices having failure domains.

In one embodiment, a method for detecting bit rot in distributed storage devices having failure domains may include (1) receiving, at a computing device, a combination of data chunks created by adding, for each failure domain storing data chunks, data chunks from different stripes, (2) receiving a combination of parity chunks created by adding, for each failure domain storing parity chunks, parity chunks from the different stripes, (3) creating at least one new parity chunk from the combination of data chunks, and (4) identifying a presence of bit rot in the failure domains when the at least one new parity chunk does not match the received combination of parity chunks.

In examples, the method may include sending a command to the failure domains storing data chunks to create the combination of data chunks. In embodiments, the method may include sending a command to the failure domains storing parity chunks to create the combination of parity chunks.

In one example, creating at least one new parity chunk further includes multiplying each combination of data chunks by a respective weight and adding the resultant products.

In embodiments, the method may include rewriting, when bit rot is identified, at least one data chunk to a respective failure domain in a respective distributed storage device. In some examples, the method may include rewriting, when bit rot is identified, at least one parity chunk to a respective failure domain in a respective distributed storage device.

In further embodiments, the method may include (1) identifying, in response to identifying the bit rot, a potential security risk associated with the distributed storage devices and (2) performing, in response to identifying the potential security risk, a security action in an attempt to ameliorate the potential security risk.

In one example, a system for detecting bit rot in distributed storage devices having failure domains may include several modules stored in memory, including (1) a first receiving module, stored in a memory, that receives a combination of data chunks created by adding, for each failure domain storing data chunks, data chunks from different stripes, (2) a second receiving module, stored in the memory, that receives a combination of parity chunks created by adding, for each failure domain storing parity chunks, parity chunks from the different stripes, (3) a creating module, stored in the memory, that creates at least one new parity chunk from the combination of data chunks, (4) an identifying module, stored in the memory, that identifies a presence of bit rot in the failure domains when the at least one new parity chunk does not match the received combination of parity chunks. The system may also include at least one physical processor that executes the first receiving module, the second receiving module, the creating module, and the identifying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at the computing device, a combination of data chunks created by adding, for each failure domain storing data chunks, data chunks from different stripes, (2) receive a combination of parity chunks created by adding, for each failure domain storing parity chunks, parity chunks from the different stripes, (3) create at least one new parity chunk from the combination of data chunks, and (4) identify a presence of bit rot in the failure domains when the at least one new parity chunk does not match the received combination of parity chunks.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
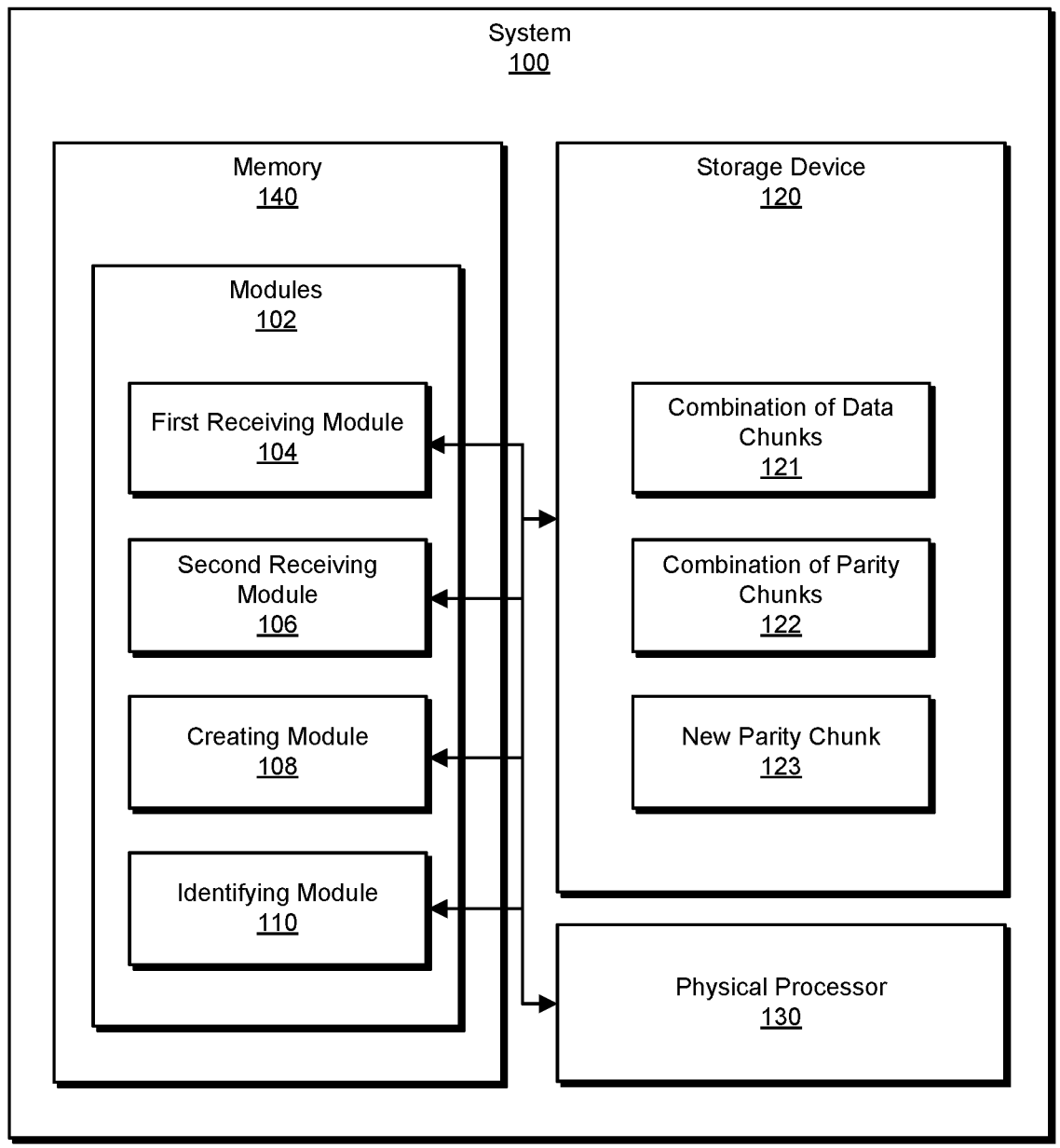
FIG. 1 is a block diagram of an example system for detecting bit rot in distributed storage devices having failure domains.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting bit rot in distributed storage devices having failure domains. In some examples, the systems and methods described herein may provide techniques for detecting bit rot that analyze combinations of data chunks and combinations of parity chunks. Servers and/or distributed storage devices prepare the respective combinations of data chunks and/or respective combinations of parity chunks from different stripes. The combinations are sent via networks to computing devices, as opposed to conventional methods that send all data chunks and all parity chunks via a network for remote analysis. The computing devices calculate new parity chunks from the combination of data chunks and compare the new parity chunks to the received combinations of parity chunks to identify presence and/or absences of matches. When matches are not made, bit rot is present in at least one of the stripes that originated the respective combinations of data chunks and combinations of parity chunks.

By doing so, the systems and methods described herein may improve functioning of computing devices by enabling sending less data over networks, reducing network traffic, and enabling faster detection of bit rot, when compared to conventional techniques. The systems and methods described herein may also mitigate security risks associated with distributed storage devices. Further, the systems and methods described herein may improve functioning of computing devices by increasing reliability of information stored in distributed storage devices.

Figure 2:
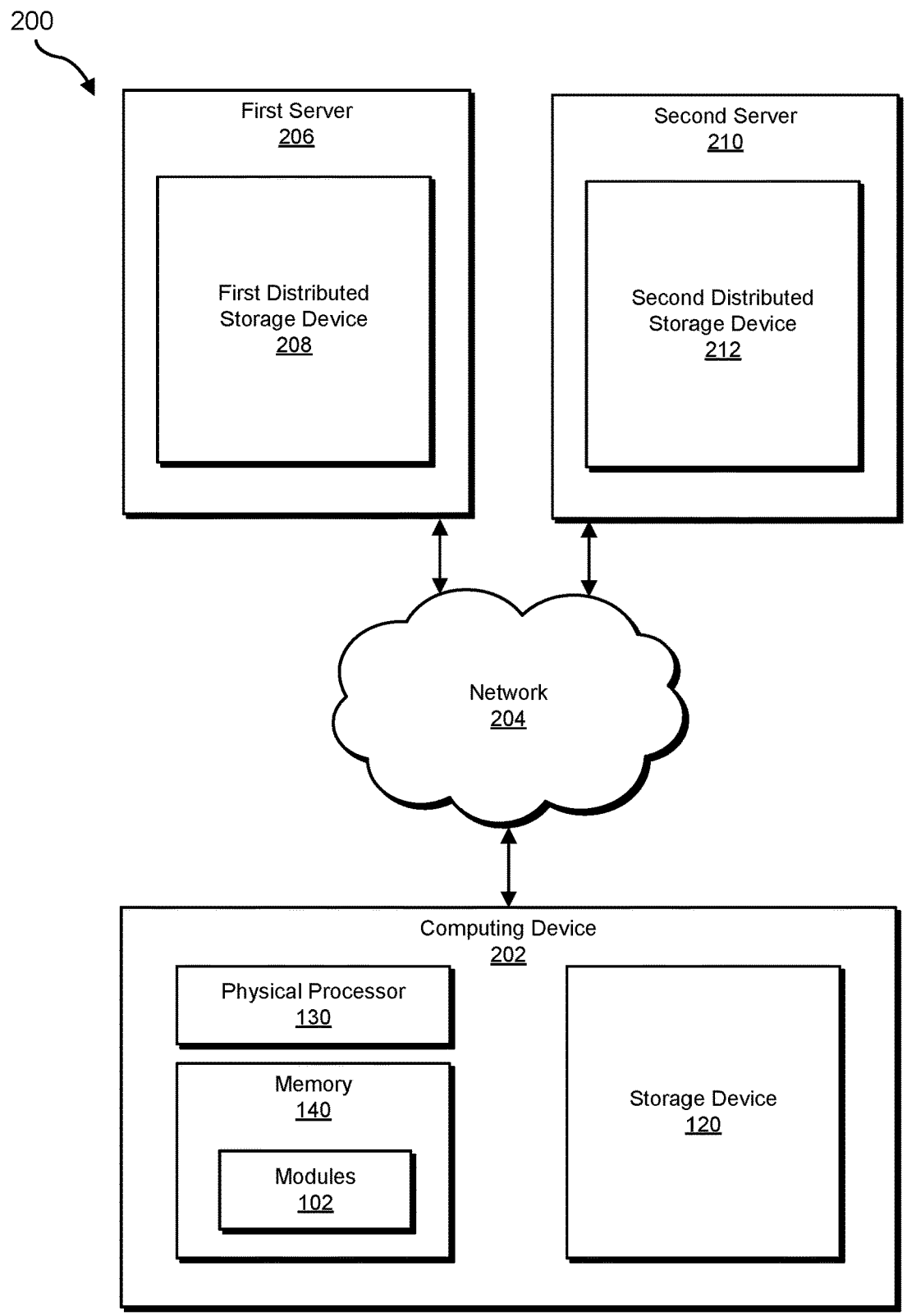
FIG. 2 is a block diagram of an additional example system for detecting bit rot in distributed storage devices having failure domains.
Figure 3:
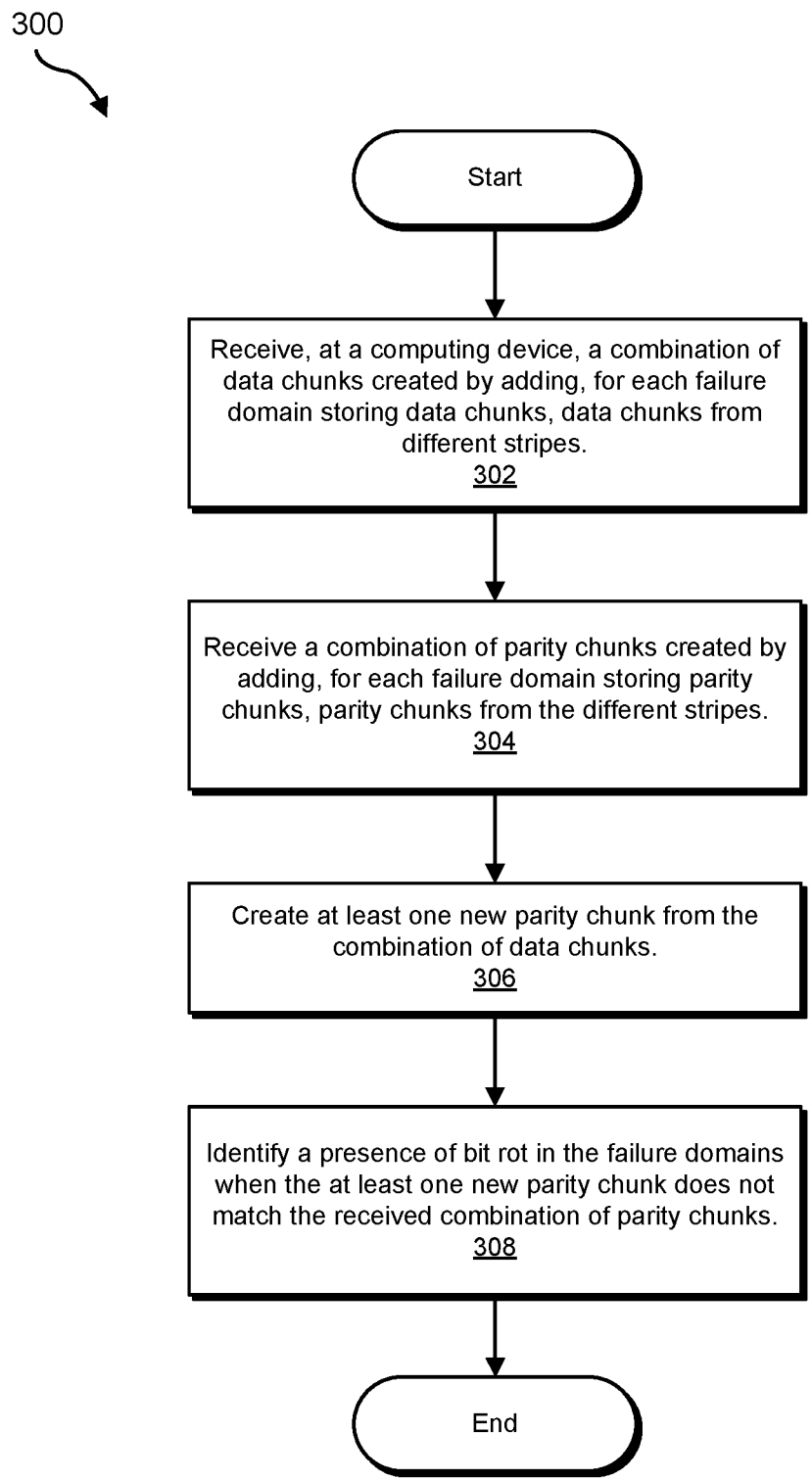
FIG. 3 is a flow diagram of an example method for detecting bit rot in distributed storage devices having failure domains.
Figure 4:
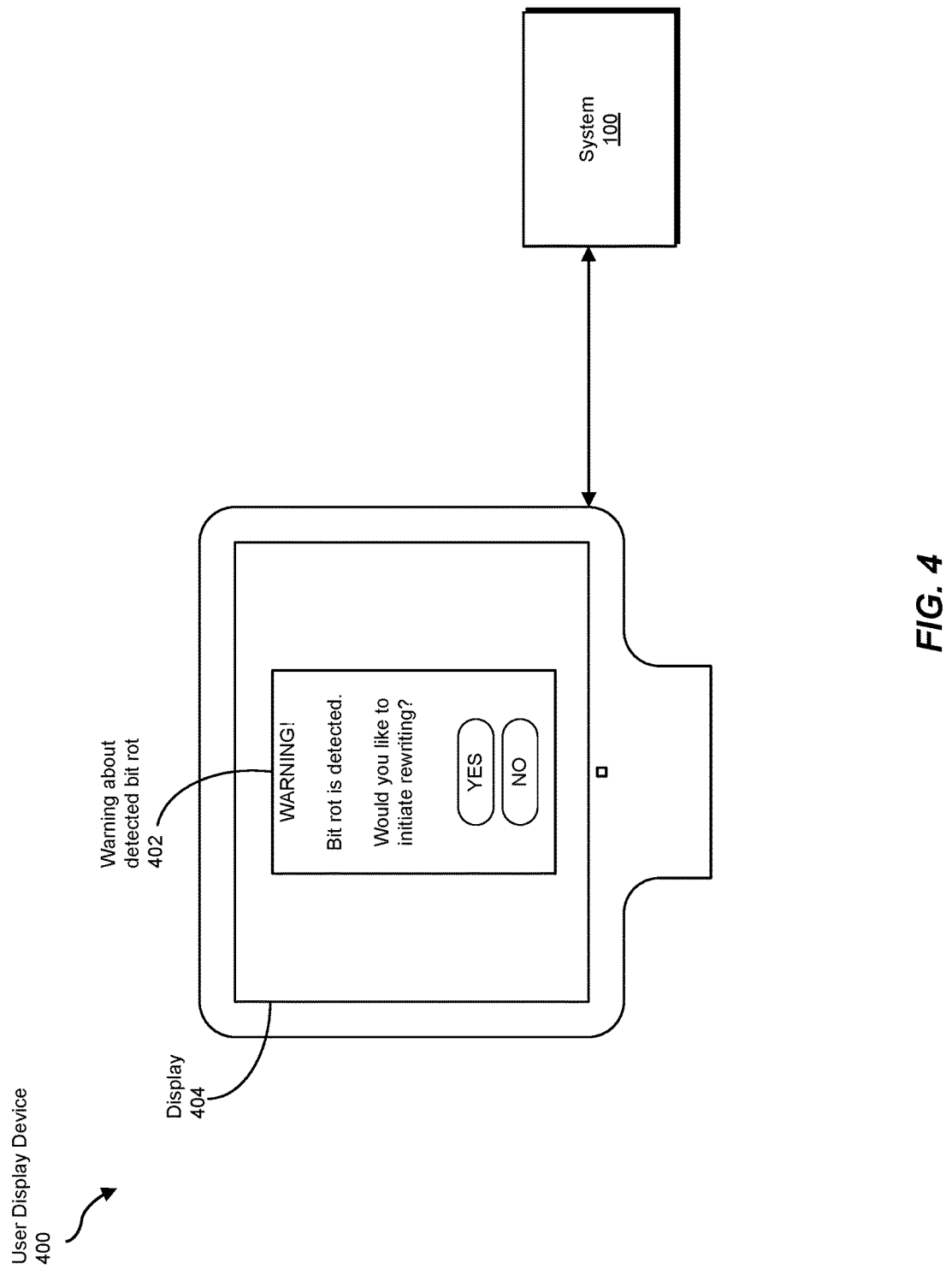
FIG. 4 is a block diagram of an example warning that may be displayed on a user display device.

The following will provide, with reference to FIGS. 1-2 and 4, detailed descriptions of example systems for detecting bit rot in distributed storage devices having failure domains. Detailed descriptions of corresponding computer-implemented methods will also be provided in connection with FIG. 3.

FIG. 1 is a block diagram of an example system 100 for detecting bit rot in distributed storage devices having failure domains. As illustrated in this figure, example system 100 may include one or more modules 102 for performing one or more tasks. As will be explained in greater detail below, modules 102 may include a first receiving module 104, a second receiving module 106, a creating module 108, and an identifying module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of combination of data chunks 121, combination of parity chunks 122, and/or new parity chunk 123. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting bit rot in distributed storage devices having failure domains. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

The term "failure domain," as used herein, generally refers to at least portions of storage devices (e.g., first distributed storage device 208 in FIG. 2, second distributed storage device 212 in FIG. 2) that may be capable of storing information which may be susceptible to bit rot. In some embodiments, failure domains may be any type or form of volatile or non-volatile storage device or medium capable of storing data and/or computer-readable instructions. In one example, failure domains may store, load, and/or maintain information indicating one or more of data chunks and/or parity chunks. Examples of failure domains may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a first server 206 via a network 204 and/or a second server 210 via network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to detect bit rot in distributed storage devices.

Computing device 202 generally represents any type or form of computing device capable of reading computer-executable instructions. In some examples, computing device 202 may represent computers running user-side software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202, first server 206, and second server 210. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

First server 206 generally represents any type or form of at least one computing device that is capable of storing information in a first distributed storage device 208. Additional examples of first server 206 include, without limitation, storage servers, database servers, application servers, and/or web servers configured to run certain software applications and/or provide various storage, database, and/or web services. Although illustrated as a single entity in FIG. 2, first server 206 may include and/or represent a plurality of servers that work and/or operate in conjunction with one another.

First distributed storage device 208 generally represents any type or form of at least one storage device that is capable of storing information. In examples, at least a portion of first distributed storage device 208 may be a failure domain. First distributed storage device 208 generally represents any type or form of volatile or non-volatile storage device or medium capable of storing data and/or computer-readable instructions which may be susceptible to bit rot. In one example, first distributed storage device 208 may store, load, and/or maintain information indicating one or more of data chunks and/or parity chunks. Examples of first distributed storage device 208 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Second server 210 generally represents any type or form of at least one computing device that is capable of storing information in a second distributed storage device 212. Additional examples of second server 210 include, without limitation, storage servers, database servers, application servers, and/or web servers configured to run certain software applications and/or provide various storage, database, and/or web services. Although illustrated as a single entity in FIG. 2, second server 210 may include and/or represent a plurality of servers that work and/or operate in conjunction with one another.

Second distributed storage device 212 generally represents any type or form of at least one storage device that is capable of storing information. In examples, at least a portion of second distributed storage device 212 may be a failure domain. Second distributed storage device 212 generally represents any type or form of volatile or non-volatile storage device or medium capable of storing data and/or computer-readable instructions which may be susceptible to bit rot. In one example, second distributed storage device 212 may store, load, and/or maintain information indicating one or more of data chunks and/or parity chunks. Examples of second distributed storage device 212 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Though first server 206 and second server 210 are depicted in FIG. 2, in examples, system 200 may implement at least one additional server (i.e., a third server, etc.) coupled to least one respective distributed storage device (i.e., a third distributed storage device, etc.) and coupled to network 204.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for detecting bit rot in distributed storage devices having failure domains. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

A detailed example implementing method 300 follows the description of step 308 below.

As illustrated in FIG. 3, at step 302 one or more of the systems described herein may receive a combination of data chunks created by adding, for each failure domain storing data chunks, data chunks from different stripes. The systems described herein may perform step 302 in a variety of ways. For example, first receiving module 104 may receive combination of data chunks 121 created by adding, for each failure domain storing data chunks, data chunks from different stripes.

In additional examples, method 300 may include sending commands to the failure domains storing data chunks to create the combination of data chunks. In response, the failure domains storing data chunks may create the combination of data chunks by adding data chunks from different stripes. The failure domains storing data chunks may then send the combination of data chunks via a network. For example, computing device 202 may send a command to first server 206 and second server 210 to send respective combinations of data chunks 121. First server 206 and second server 210 receive the command, retrieve respective constituent data chunks from first distributed computing device 208 and second distributed computing device 212, and create respective combinations of data chunks 121, which are sent via network 204 to computing device 202.

The term "stripe," as used herein, generally refers to a logical sequential segment of stored data. Striping may spread data across multiple storage devices to reduce access time, increase storage reliability, and improve storage performance.

As illustrated in FIG. 3, at step 304 one or more of the systems described herein may receive a combination of parity chunks created by adding, for each failure domain storing parity chunks, parity chunks from the different stripes. The systems described herein may perform step 304 in a variety of ways. For example, second receiving module 106 may receive combination of parity chunks 122 created by adding, for each failure domain storing parity chunks, parity chunks from the different stripes.

In additional examples, method 300 may include sending commands to the failure domains storing parity chunks to create combinations of parity chunks. In response, the failure domains storing parity chunks may create the combination of parity chunks by adding parity chunks from different stripes. The failure domains storing parity chunks may then send the combination of parity chunks via a network. For example, computing device 202 may send a command to first server 206 and second server 210 to send respective combinations of parity chunks 122. First server 206 and second server 210 receive the command, retrieve respective constituent parity chunks from first distributed computing device 208 and second distributed computing device 212, and create respective combinations of parity chunks 122, which are sent via network 204 to computing device 202.

As illustrated in FIG. 3, at step 306 one or more of the systems described herein may create at least one new parity chunk from the combination of data chunks. The systems described herein may perform step 306 in a variety of ways. For example, creating module 106 may create at least one new parity chunk 123 from combination of data chunks 121.

In additional examples, method 300 may include creating at least one new parity chunk by multiplying combinations of data chunks by respective weights and adding the resultant products.

As illustrated in FIG. 3, at step 308 one or more of the systems described herein may identify presence of bit rot in the failure domains when the at least one new parity chunks do not match the received combinations of parity chunks. The systems described herein may perform step 308 in a variety of ways. For example, identifying module 110 may identify a presence of bit rot in the failure domains when the at least one new parity chunk 123 does not match the received combination of parity chunks 122.

In additional examples, method 300 may include rewriting, when bit rot is identified, data chunks to respective failure domains in respective distributed storage devices. In some embodiments, method 300 may include rewriting, when bit rot is identified, parity chunks to respective failure domains in respective distributed storage devices.

In additional examples, method 300 may include (1) identifying, in response to identifying the bit rot, potential security risks associated with the distributed storage devices and (2) performing, in response to identifying the potential security risks, security actions in attempts to ameliorate the potential security risks.

In further examples, method 300 may further include displaying warnings about presence of bit rot. FIG. 4 depicts an example of a user display device 400 coupled to system 100. In this example, user display device 400 may display a warning about presence of detected bit rot 402 via a display 404 upon detecting bit rot. Warning about presence of detected bit rot 402 may warn a user of user display device 400 of the detected presence of bit rot. In some embodiments, warning about presence of detected bit rot 402 may display options as to how to proceed and/or enable receiving input as to how to proceed. In some examples, these options to proceed may include rewriting data and/or parity information.

A detailed non-limiting example implementing method 300 follows. Data chunks $D(x,y)$ and parity chunks $P(x,y)$ are stored in stripes across multiple distributed storage devices (e.g., first distributed computing device 208 and second distributed computing device 212). This array depicts such an arrangement:

D11 D12 D13 D14 P11 P12
D21 D22 D23 D24 P21 P22
D31 D32 D33 D34 P31 P32
D41 D42 D43 D44 P41 P42

The columns identify data and parity chunks that are stored in the same distributed storage device (also known as a node). The rows correspond with stripes. For example, a first distributed storage device stores data chunks D11, D21, D31, and D41 while a second distributed storage device stores data chunks D12, D22, D32, and D42. A fifth distributed storage device stores parity chunks P11, P21, P31, and P41. The parity chunks may be formed by applying linear equations to respective data chunks. For example:

$$P1=D1+D2+D3+D4$$

$$P2=D1+(2*D2)+(4*D3)+(8*D4)$$

Thus, $$P11=D11+D12+D13+D14$$

$$P12=D11+(2*D12)+(4*D13)+(8*D14)$$

Continuing with this example, a first stripe includes D11, D12, D13, D14, P11, and P12. A second stripe includes D21, D22, D23, D24, P21, and P22. A third stripe includes D31, D32, D33, D34, P31, and P32. A fourth stripe includes D41, D42, D43, D44, P41, and P42. This arrangement of four data chunks and two parity chunks may tolerate two failures and maintain data integrity.

For this example, conventional bit rot detection techniques transmit all 24 data and parity chunks over a network, which consumes a lot of time and bandwidth. However, for this example, the provided techniques only transmit 6 chunks, which reduces network traffic by 75%.

For this example, the provided techniques send combinations of data and parity chunks (e.g., combination of data chunks 121 and combination of parity chunks 122). The combinations of data chunks (C11, C21, C31, and C41) are computed (e.g., by first server 106 and second server 210) as:

Node 1 C11=D11+D21+D31+D41
Node 2 C21=D12+D22+D32+D42
Node 3 C31=D13+D23+D33+D43
Node 4 C41=D14+D24+D34+D44

In this example, the combinations of parity chunks (C51 and C61) are computed as:

Node 5 C51=P11+P21+P31+P41
Node 6 C61=P12+P22+P32+P42

After preparing the combinations of data chunks and the combinations of parity chunks, each node (e.g., first server 106 and second server 210) sends their respective combinations of data chunks and combinations of parity chunks via a network (e.g., network 204) to a computing device (e.g., computing device 202). Thus, only 6 chunks are sent via the network—node 1 sends C11, node 2 sends C21, node 3 sends C31, node 4 sends C41, node 5 sends C51, and node 6 sends C61.

The computing device receives the combinations of data chunks via the network, such as by performing step 302. The computing device also receives the combinations of parity chunks via the network, such as by performing step 304. Upon receipt, the computing device calculates at least one new parity chunk (e.g., new parity chunk 123) from the combination of data chunks (e.g., combination of data chunks 121), such as by performing step 306. For this example, new parity chunks (C51' and C61') are calculated as:

$$C51'=C11+C21+C31+C41$$

$$C61'=C11+(2*C21)+(4*C31)+(8*C41)$$

The new parity chunks are compared (e.g., by computing device 202) to the received combinations of parity chunks to identify a presence of bit rot in the failure domains, such as by performing step 308. In other words, C51 is compared to C51'. Further, C61 is compared to C61'. When parities match, there is no bit rot in any of the four stripes. When the parities do not match, then bit rot may be present in at least one of the four stripes. In examples, upon detecting bit rot, each stripe may subsequently be individually checked for bit rot to identify a specific location of rotten data and the data rewritten. In other embodiments, an entire group of stripes that originated the combinations of data chunks and combinations of parity chunks may be rewritten.

As detailed above, the steps outlined in method 300 in FIG. 3 may provide techniques for detecting and correcting bit rot that analyze combinations of data chunks and combinations of parity chunks. By doing so, the systems and methods described herein may enable sending less data over networks and/or may enable faster detection of bit rot, when compared to conventional techniques.

In a non-limiting practical application, conventional techniques for analyzing a 400 GB volume for bit rot required over 33 minutes and transferring 600 GB. Analyzing the same volume with the provided techniques required under 11 minutes and transferring only 150 GB.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting bit rot in distributed storage devices having failure domains, at least a portion of the method being performed by a computing device comprising at least one processor, the method comprising:
   receiving, at the computing device, sums of data chunks, wherein:
      each sum of data chunks in the sums of data chunks is created by adding, for each respective failure domain storing data chunks, one data chunk from each different stripe in a plurality of stripes; and
      only one sum of data chunks is received for each respective failure domain storing data chunks;
   receiving sums of parity chunks, wherein:
      each sum of parity chunks in the sums of parity chunks is created by adding, for each respective failure domain storing parity chunks, one parity chunk from each different stripe in the plurality of stripes; and
      only one sum of parity chunks is received for each respective failure domain storing parity chunks;
   creating at least one new parity chunk from the sums of data chunks; and
   identifying a presence of bit rot in the failure domains when the at least one new parity chunk does not match any of the received sums of parity chunks.

2. The computer-implemented method of claim 1, further comprising:
   sending a command to the failure domains storing data chunks to create the sums of data chunks.

3. The computer-implemented method of claim 1, further comprising:
   sending a command to the failure domains storing parity chunks to create the sums of parity chunks.

4. The computer-implemented method of claim 1, wherein creating at least one new parity chunk further includes multiplying each sum of data chunks by a respective weight and adding the resultant products.

5. The computer-implemented method of claim 1, further comprising:
   rewriting, when bit rot is identified, at least one data chunk to a respective failure domain in which the bit rot is identified in a respective distributed storage device.

6. The computer-implemented method of claim 1, further comprising:
   rewriting, when bit rot is identified, at least one parity chunk to a respective failure domain storing a parity chunk corresponding to at least one data chunk in which the bit rot is identified in a respective distributed storage device.

7. The computer-implemented method of claim 1, further comprising:
   identifying, in response to identifying the bit rot, a potential security risk associated with the distributed storage devices; and
   performing, in response to identifying the potential security risk, a security action in an attempt to ameliorate the potential security risk.

8. The computer-implemented method of claim 1, wherein the receiving the sums of parity chunks further comprises receiving one sum of parity chunks per distributed storage device.

9. A system for detecting bit rot in distributed storage devices having failure domains, the system comprising:
   a first receiving module, stored in a memory, that receives sums of data chunks, wherein:
      each sum of data chunks in the sums of data chunks is created by adding, for each respective failure domain storing data chunks, one data chunk from each different stripe in a plurality of stripes; and
      only one sum of data chunks is received for each respective failure domain storing data chunks;
   a second receiving module, stored in the memory, that receives sums of parity chunks, wherein:
      each sum of parity chunks in the sums of parity chunks is created by adding, for each respective failure domain storing parity chunks, one parity chunk from each different stripe in the plurality of stripes; and
      only one sum of parity chunks is received for each respective failure domain storing parity chunks;
   a creating module, stored in the memory, that creates at least one new parity chunk from the sums of data chunks;
   an identifying module, stored in the memory, that identifies a presence of bit rot in the failure domains when the at least one new parity chunk does not match any of the received sums of parity chunks; and
   at least one physical processor that executes the first receiving module, the second receiving module, the creating module, and the identifying module.

10. The system of claim 9, further comprising:
    a sending module, stored in the memory, that sends a command to the failure domains storing data chunks to create the sums of data chunks.

11. The system of claim 9, further comprising:
    a sending module, stored in the memory, that sends a command to the failure domains storing parity chunks to create the sums of parity chunks.

12. The system of claim 9, wherein creating at least one new parity chunk further includes multiplying each sum of data chunks by a respective weight and adding the resultant products.

13. The system of claim 9, further comprising:
    a rewriting module, stored in the memory, that rewrites, when bit rot is identified, at least one data chunk to a respective failure domain in which the bit rot is identified in a respective distributed storage device.

14. The system of claim 9, further comprising:
a rewriting module, stored in the memory, that rewrites, when bit rot is identified, at least one parity chunk to a respective failure domain storing a parity chunk corresponding to at least one data chunk in which the bit rot is identified in a respective distributed storage device.

15. The system of claim 9, further comprising:
an identifying module, stored in the memory, that identifies, in response to identifying the bit rot, a potential security risk associated with the distributed storage devices; and
a performing module, stored in the memory, that performs, in response to identifying the potential security risk, a security action in an attempt to ameliorate the potential security risk.

16. A non-transitory computer-readable medium comprising one or more computer-executable instructions that, when executed by at least one processor of a computing device, cause the computing device to:
receive, at the computing device, sums of data chunks, wherein:
each sum of data chunks in the sums of data chunks is created by adding, for each respective failure domain storing data chunks, one data chunk from each different stripe in a plurality of stripes; and
only one sum of data chunks is received for each respective failure domain storing data chunks;
receive sums of parity chunks, wherein:
each sum of parity chunks in the sums of parity chunks is created by adding, for each respective failure domain storing parity chunks, one parity chunk from each different stripe in the plurality of stripes; and
only one sum of parity chunks is received for each respective failure domain storing parity chunks;
create at least one new parity chunk from the sums of data chunks; and
identify a presence of bit rot in the failure domains when the at least one new parity chunk does not match any of the received sums of parity chunks.

17. The non-transitory computer-readable medium of claim 16, wherein the computer-executable instructions comprise computer-executable instructions that cause the computing device to:
send a command to the failure domains storing data chunks to create the sums of data chunks.

18. The non-transitory computer-readable medium of claim 16, wherein the computer-executable instructions comprise computer-executable instructions that cause the computing device to:
send a command to the failure domains storing parity chunks to create the sums of parity chunks.

19. The non-transitory computer-readable medium of claim 16, wherein creating at least one new parity chunk further comprises multiplying each sum of data chunks by a respective weight and adding the resultant products.

20. The non-transitory computer-readable medium of claim 16, wherein the computer-executable instructions comprise computer-executable instructions that cause the computing device to:
rewrite, when bit rot is identified, at least one data chunk to a respective failure domain in which the bit rot is identified in a respective distributed storage device.

21. The non-transitory computer-readable medium of claim 16, wherein the computer-executable instructions comprise computer-executable instructions that cause the computing device to:
rewrite, when bit rot is identified, at least one parity chunk to a respective failure domain storing a parity chunk corresponding to at least one data chunk in which the bit rot is identified in a respective distributed storage device.

* * * * *